United States Patent
Shi et al.

(10) Patent No.: US 9,761,378 B2
(45) Date of Patent: Sep. 12, 2017

(54) PROCESS TO IMPROVE COVERAGE AND ELECTRICAL PERFORMANCE OF SOLID ELECTROLYTIC CAPACITORS

(71) Applicants: Yaru Shi, Simpsonville, SC (US); Antony P. Chacko, Simpsonville, SC (US); Hong Zhang, Jiangsu (CN); Qingping Chen, Simpsonville, SC (US); Lei Xu, Jiangsu (CN); Yang Jin, Jiangsu (CN); Zhen Wu, Jiangsu (CN)

(72) Inventors: Yaru Shi, Simpsonville, SC (US); Antony P. Chacko, Simpsonville, SC (US); Hong Zhang, Jiangsu (CN); Qingping Chen, Simpsonville, SC (US); Lei Xu, Jiangsu (CN); Yang Jin, Jiangsu (CN); Zhen Wu, Jiangsu (CN)

(73) Assignee: KEMET Electronics Corporation, Simpsonville, SC (US)

( * ) Notice: Subject to any disclaimer, the term of this patent is extended or adjusted under 35 U.S.C. 154(b) by 109 days.

(21) Appl. No.: 14/672,292

(22) Filed: Mar. 30, 2015

(65) Prior Publication Data
US 2016/0293339 A1    Oct. 6, 2016

(51) Int. Cl.
| H01G 4/04 | (2006.01) |
| C09D 5/24 | (2006.01) |
| H01G 9/042 | (2006.01) |
| H01G 9/15 | (2006.01) |
| H01G 9/00 | (2006.01) |
| H01G 9/012 | (2006.01) |
| H01G 9/07 | (2006.01) |
| H01G 9/025 | (2006.01) |

(52) U.S. Cl.
CPC ............. *H01G 9/042* (2013.01); *C09D 5/24* (2013.01); *H01G 9/0032* (2013.01); *H01G 9/0036* (2013.01); *H01G 9/012* (2013.01); *H01G 9/025* (2013.01); *H01G 9/07* (2013.01); *H01G 9/15* (2013.01)

(58) Field of Classification Search
None
See application file for complete search history.

(56) References Cited

U.S. PATENT DOCUMENTS

| 6,552,896 B1 * | 4/2003 | Igaki ................... H01G 9/0029 252/62.2 |
| 6,602,741 B1 * | 8/2003 | Kudoh ................... H01B 1/127 252/500 |
| 6,987,663 B2 * | 1/2006 | Merker ................... H01G 9/10 252/500 |

(Continued)

FOREIGN PATENT DOCUMENTS

| EP | 2 950 316 A1 | 12/2015 |
| EP | 2 950 317 A1 | 12/2015 |

(Continued)

*Primary Examiner* — Dion R Ferguson
(74) *Attorney, Agent, or Firm* — Joseph T. Guy; Perkins Law Firm, LLC

(57) ABSTRACT

A method for forming a capacitor, a capacitor formed thereby and an improved composition for a conductive coating are described. The method includes providing an anode, forming a dielectric on the anode and forming a cathode layer over the dielectric by applying a monoamine, a weak acid and a conductive polymer.

41 Claims, 7 Drawing Sheets

(56) References Cited

U.S. PATENT DOCUMENTS

| | | | | |
|---|---|---|---|---|
| 7,154,740 B2* | 12/2006 | Merker | ............... | C08G 61/126 |
| | | | | 252/62.2 |
| 8,124,277 B2 | 2/2012 | Anada et al. | | |
| 2005/0111165 A1* | 5/2005 | Merker | ................... | H01G 9/10 |
| | | | | 361/525 |
| 2005/0248910 A1 | 11/2005 | Merker | | |
| 2011/0102973 A1 | 5/2011 | Reuter et al. | | |
| 2012/0057275 A1 | 3/2012 | Intelmann et al. | | |
| 2012/0206860 A1 | 8/2012 | Chen et al. | | |
| 2013/0016453 A1* | 1/2013 | Ito | ......................... | H01G 9/042 |
| | | | | 361/528 |
| 2014/0340819 A1* | 11/2014 | Zhang | ................. | H01G 9/0036 |
| | | | | 361/523 |
| 2015/0187496 A1* | 7/2015 | Chien | ................... | H01G 9/022 |
| | | | | 361/504 |

FOREIGN PATENT DOCUMENTS

| | | |
|---|---|---|
| FR | 2 988 212 | 9/2013 |
| JP | 200-128033 | 4/2004 |
| JP | 2005-109248 | 4/2005 |
| JP | 2007-180260 | 7/2007 |
| JP | 2010 116441 | 5/2010 |
| JP | 2011 138814 | 7/2011 |
| JP | 2012 180395 | 9/2012 |
| WO | WO 2010/089111 | 8/2010 |

* cited by examiner

PROCESS TO IMPROVE COVERAGE AND ELECTRICAL PERFORMANCE OF SOLID ELECTROLYTIC CAPACITORS

BACKGROUND

The present invention is related to an improved method of forming a capacitor and improved capacitors formed thereby. More specifically, the present invention is related to the use of monoamines in combination with weak acids as a coating additive particularly for intrinsically conductive polymers. Superior coverage of a surface, such as a dielectric, is provided thereby while maintaining superior electrical properties of the capacitor.

Solid electrolytic capacitors with conductive polymers as the cathode are widely used in the electronics industry, and elsewhere, because of their low equivalent series resistance (ESR) and "non-burning" healing mechanism. Typical methods for applying conductive polymers onto a dielectric include in situ chemical/electrochemical oxidation polymerization and coating of preformed conductive polymer dispersions or solutions. Compared with an in-situ polymerization method, coating of preformed conductive polymer is much simpler and less costly.

One particular concern with the conductive polymer coating process is how to form a defect free polymer coating. As described in U.S. Pat. No. 7,658,986, a continuous coating of all dielectric surface by primary cathode materials is essential to prevent short circuit electrical failure. However, as with any coating process, surface tension of the conductive polymer dispersion could cause it to retreat from edges and corners during the drying process resulting in insufficient coverage in these areas. Corners and edges are most susceptible to mechanical or thermal mechanical stress during the capacitor manufacturing process. Without a sufficient polymer layer on the corners and edges the dielectric in these areas may be damaged and subsequent layers, such as carbon and metal layers, can come into direct contact with the dielectric leading to increased residual currents and other reliability issues.

One approach to improving edge and corner coverage is to modify the anode design as disclosed in U.S. Pat. No. 7,658,986; D616,388; D599,309 and D586,767. While this approach may be beneficial, it is not a universal method and has limits in practice.

Another approach mentioned by EP-A-1524678, EP-A-1746613 and U.S. Pat. No. 7,411,779 is to mix solid particles with the conductive polymer dispersion. The additional solid particles can be conductive or nonconductive. However, this approach is not always reliable and reproducible. The addition of solid particles often makes the polymeric coating layer brittle, and increases residual leakage and equivalent series resistance (ESR).

Yet another approach is described in WO201089777 and U.S. Pat. No. 8,882,856, which teach the use of a crosslinker solution applied between conductive polymer dispersion dipping cycles to improve polymer coverage of the corners and edges. The effectiveness of the crosslinker is attributed to the presence of multiple cationic functional groups that form a chemical bond, referred to as "crosslinks", between polymer dispersion particles. While crosslinking does improve coverage on the anode, the crosslinker solution may contaminate the conductive polymer dispersion which causes a viscosity increase of the conductive polymer dispersion. An ion exchange process has been suggested to remove the contamination from the polymer solution or dispersion, however, this adds to manufacturing complexity. Nonetheless, contamination of conductive polymer dispersion by the crosslinker causes more difficulties in process control, and in quality control and requires additional manufacturing steps.

The formed capacitor's initial electrical performance is good with the polyvalent crosslinkers described above. However, U.S. Pat. No. 8,808,403 and U.S. Publ. Pat. Appl. No. 2014/0340819 state that the performance deteriorates over time especially, under humid conditions. The reason is that these crosslinkers are often ionic materials that contain low molecular weight strong ionic species such as sulfate or p-toluenesulfonate. These strong ionic species can dissociate completely in the presence of water and can diffuse through various cathode layers under high humid conditions. The result is higher leakage current or even electrical short failures. This is unacceptable since high humidity is a very common environmental condition for capacitors. The migration of strong ionic species could also cause serious corrosion on certain metals, particularly aluminum. U.S. Pat. No. 8,808,403 suggests the use of a water wash step after the conductive polymer layer is dried to remove the ionic species from the cured conductivity layer. This approach suffers from other tradeoffs such as delamination of polymer from the dielectric, increased ESR and poor ESR stability. An additional washing step also requires a capital investment and is a detriment to manufacturing efficiency.

U.S. Publ. Pat. Appl. No. 2012/0206859 describes four different types of coverage enhancers including amino acids, amine-sulfonic acid salts, quaternary amine halide or sulfonate salts, and nanoparticles. The low molecular weight strong ionic species such as sulfonate and halides, increases the risk of poor leakage performance under humidity.

U.S. Publ. Pat. Appl. No. 2014/0340819 describes the use of diamines, triamines or polyamines in combination with weak acids, such as acids with a dissociation constant or pKa 0.25-6, as a crosslinker. This combination alleviates the corrosion on aluminum anodes, however, as long as a "crosslinker" is involved in the process, the contamination and viscosity increase of the conductive polymer dispersion or solution is still a problem.

U.S. Pat. No. 8,771,381 teaches the application of nonionic polyol prior to or in between conductive polymer dispersion layers to improve polymer corner and edge coverage. The capacitors are less susceptible to the corrosion caused by ionic species under high humidity conditions, however, the edge and corner coverage enhancement is still inferior.

In spite of the ongoing effort those of skill in the art still do not have a suitable option for the formation of polymer layers from a preformed dispersion which provides adequate coverage of the edges and corners and which is suitable for high humidity conditions. So a need still exists for materials and methods that improve corner and edge coverage of an anode without the negative effect on the leakage performance of the capacitor when exposed to humidity, or on the processability of the conductive polymer dispersion.

SUMMARY OF THE INVENTION

It is an object of the invention to provide an improved layer of intrinsically conducting polymer and a method for forming a conductive layer of intrinsically conducting polymer.

A particular feature of the invention is an improvement in coverage, particularly in the coverage of edges and corners, particularly of a dielectric.

It is another object of the invention to provide an improved capacitor formed by the improved layer of intrinsically conductive polymer.

These and other advantages, as will be realized, are provided in a method for forming a capacitor. The method includes providing an anode, forming a dielectric on the anode and forming a cathode layer over the dielectric by applying a monoamine, a weak acid and a conductive polymer.

Yet another embodiment is provided in a capacitor. The capacitor comprises an anode with a dielectric at least partially encasing the anode. A cathode is on the dielectric wherein the cathode comprises an intrinsically conducting polymer, a weak acid and a monoamine.

Yet another embodiment is provided in a composition for the formation of a conductive coating comprising an intrinsically conducting polymer, a weak acid and a monoamine.

FIGURES

DESCRIPTION

The instant invention is specific to an improved method for forming a conductive coating and more particularly a conductive coating as the cathode of a solid electrolytic capacitor and an improved capacitor formed therewith. More specifically, the present invention is related to a method of forming a cathode of preferably preformed intrinsically conductive polymer utilizing monoamines and weak acids whereby the polymer coverage is improved without detrimental impacts on the electrical performance properties of the capacitor, especially, in the presence of high humidity.

Surprisingly, it has been found that improvements in the edge and corner coverage can be met by using monoamines which are acidified or neutralized with weak acids in the cathode layer of capacitors. This combination exhibits good polymer corner and edge coverage even though they can not crosslink the conductive polymer dispersion as was previously thought necessary.

The invention will be described with reference to the various figures which form an integral non-limiting component of the disclosure. Throughout the disclosure similar elements will be numbered accordingly. In FIGS. 4-7, 9-10 and 12 light areas represent poor coverage as can be noticed, particularly, on the edges and corners.

Figure 1:
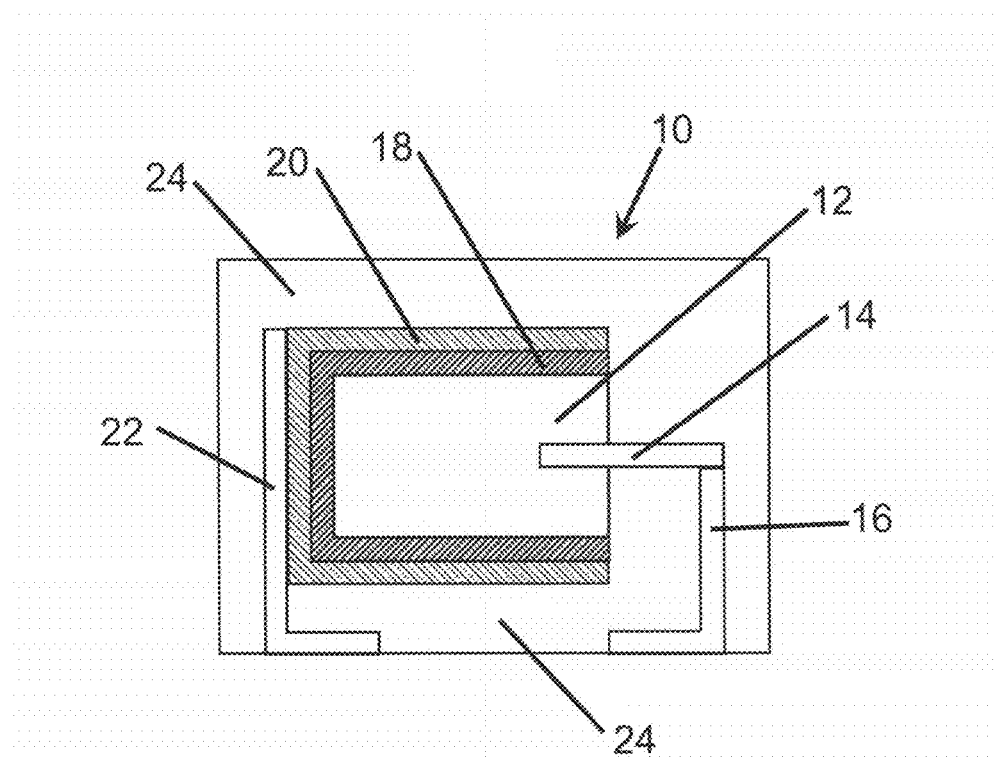
FIG. 1 is a schematic view of an embodiment of the invention.

An embodiment of the invention is illustrated in cross-sectional schematic side view in FIG. 1. In FIG. 1, a capacitor, generally represented at 10, comprises an anode, 12, with an anode lead wire, 14, extending therefrom or attached thereto. The anode lead wire is preferably in electrical contact with an anode lead, 16. A dielectric, 18, is formed on the anode and preferably the dielectric encases at least a portion, and preferably the entire, anode. A cathode, 20, is on the dielectric and encases a portion of the dielectric with the proviso that the cathode and anode are not in direct electrical contact. A cathode lead, 22, is in electrical contact with the cathode. In many embodiments it is preferable to encase the capacitor in a non-conductive resin, 24, with at least a portion of the anode lead and cathode lead exposed for attachment to a circuit board as would be readily understood by one of skill in the art. The cathode may comprise multiple sub-layers. The present invention is directed to improvements in the cathode layer, 20, and more particularly to the formation of an improved cathode layer.

Figure 2:
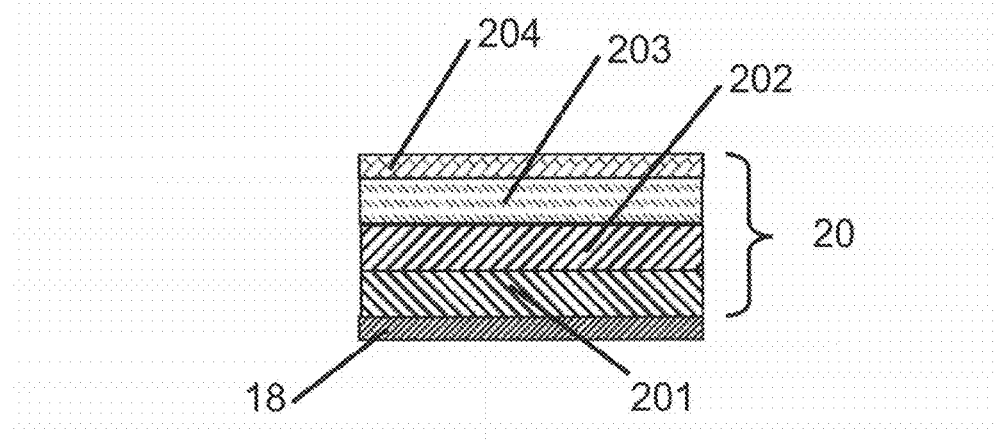
FIG. 2 is a schematic view of an embodiment of the invention.

An embodiment of the invention is illustrated in partial cross-sectional schematic view in FIG. 2. In FIG. 2, the cathode, 20, comprises multiple interlayers, 201-204, which are illustrated schematically, wherein the cathode is formed on the dielectric, 18. While not limited thereto the cathode interlayers are preferably selected from layers containing conductive polymer, carbon containing layers and metal containing layers most preferably in sequential order. In a particularly preferred embodiment a first interlayer, 201, is at least one conductive polymer layer formed either by in-situ polymerization or by repeated dipping in a preformed conductive polymer preferably in a carrier liquid, with at least partial drying between dips. It is well understood that soldering a lead frame, or external termination, to a polymeric cathode is difficult. It has therefore become standard in the art to provide conductive interlayers which allow for solder adhesion. A second interlayer, 202, which is preferably at least one carbon containing interlayer, is typically applied to the conductive polymer interlayer, 201. The carbon interlayer, or series of carbon interlayers, provides adhesion to the conductive polymer interlayer and provides a layer upon which a third interlayer, which is preferably at least one metal containing interlayer, 203, will adequately adhere. Particularly preferred metal containing layers comprise silver, copper or nickel. The metal interlayer allows external terminations, such as a cathode lead to be attached to the cathodic side of the capacitor such as by solder or an adhesive interlayer, 204. Each interlayer, though represented herein as a single layer, is typically formed from multiple applications of materials to form the interlayer. With particular reference to the conductive polymer interlayer, 201, the conductive polymer interlayer may be formed by the sequential formation of layers including the conductive polymer, monoamines and weak acids wherein any combination of the conductive polymer, monoamine and weak acid may be formed from a mixture thereof or each may be formed separately and sequentially.

A particular advantage of the instant invention is the ability to form the cathode layer from a single composition.

Prior art formulations typically rely on crosslinkers and/or strong acids to form intermolecular bonds. For anything larger than a laboratory scale coating these materials are applied separately to avoid premature reaction. Therefore, the conductive polymer layer and cross-linking or adhesion promoting layer require sequential application or the use of small batches of frequently replaced combinations neither of which is efficient. Even with sequential application cross-contamination of one component to the other often occurs as unreacted reagent may be carried from one application point to the other. With the instant invention the conductive polymer, mono-amine and weak acid can be in a common vessel for extended periods of time thereby allowing all three components to be applied in concert. This is a significant advantage with regards to manufacturing simplicity and there is no problem associated with carry-over contamination.

Figure 3:
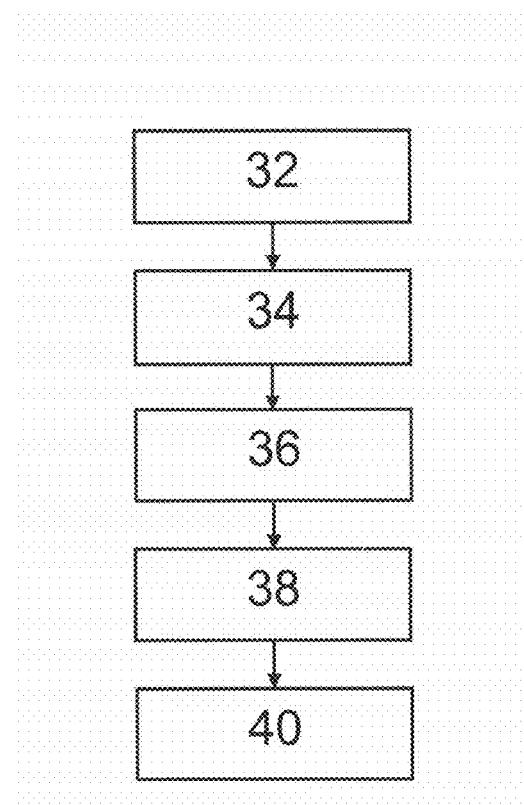
FIG. 3 is a flow chart representation of an embodiment of the invention.

An embodiment of the invention is illustrated in flow chart form in FIG. 3. In FIG. 3, the method of forming a solid electrolytic capacitor of the instant invention is illustrated. In FIG. 3, an anode is provided at 32. A dielectric is formed on the surface of the anode at 34 with a particularly preferred dielectric being the oxide of the anode. A cathode layer is formed at 36 wherein the cathode preferably comprises multiple interlayers. Interlayers may include at least one conducting polymer layer wherein the intrinsically conducting polymer is either formed in-situ or the layer is formed by coating with a preformed intrinsically conducting polymer preferably in a carrier liquid. The interlayers also preferably comprise at least one carbon containing layer and at least one metal containing layer. Anode and cathode leads are attached to the anode and cathode respectively at 38 and the capacitor is optionally, but preferably, encased at 40 and tested.

The conductive polymer layer may be formed in a single step wherein at least the conductive polymer and optionally the monoamine and weak acid, along with any adjuvants such as binder, dopant, solvent and the like are applied, preferably in a carrier liquid thereby forming a solution, slurry or dispersion. Alternatively, the conductive polymer layer may be formed in multiple steps wherein components of the layer are applied separately. In one embodiment a conductive polymer layer is coated before or after coating of the monoamine and weak acid either together or separately. In another embodiment the conductive polymer is applied in concert with one of the monoamine or the weak acid followed by application of the other of the monoamine or weak acid. In a preferred embodiment the polymer is applied separately with a combination of the weak acid and monoamine applied before and/or after the polymer application with each layer repeated alternately until sufficient polymer thickness is achieved. In another preferred embodiment, the polymer is applied in concert with both the monoamine(s) and the weak acid(s) preferably in a carrier liquid. Applying the different components in concert is beneficial since it reduces the number of processing steps and improves manufacturing efficiency. Prior art methods typically require multiple dip cycles wherein each dip is into either a single component of some combination of components selected from oxidizer, monomer precursor of conductive polymer, conductive polymer, cross-linker and the like. Some combinations are preferably avoided such as oxidizer and monomer or crosslinker and polymer due to concerns related to premature reaction. In reality, crossover of the components from one dip is often carried over to subsequent dips as complete avoidance of this is very difficult. Therefore, each dip may likely contain some level of components from a previous dip which may be tolerated or, in some cases, advantageous at certain levels.

The cathode is a conductor preferably comprising a conductive polymeric material. Particularly preferred conductive polymers include intrinsically conductive polymers most preferably selected from polypyrrole, polyaniline and polythiophene. The cathode may include multiple interlayers wherein adhesion layers are employed to improve adhesion between the conductor and the termination. Particularly preferred adhesion interlayers include carbon, silver, copper, or another conductive material in a binder. The cathode is preferably formed by dipping, coating or spraying either conductive polymer or a conductive polymer precursor which is polymerized by an oxidant as known in the art with the polymer or precursor preferably in a carrier liquid. For the purposes of the instant invention it is preferable to apply layers of preformed conductive polymer such as in a slurry. Carbon and metal containing layers are typically formed by dipping into a carbon containing liquid or by coating. The carbon containing layers and metal containing layers can be formed by electroplating and this is a preferred method, in one embodiment, particularly for the metal containing layer.

The conductive polymer has a backbone defined as $-(CR^1R^2-CR^3R^4-)_x-$ wherein at least one of $R^1$, $R^2$, $R^3$ or $R^4$ comprises a group selected from thiophene, pyrrole or aniline which may be substituted. Subscript x is at least 2 to no more than 1000. None of $R^1$, $R^2$, $R^3$ or $R^4$ contain —SOOH or COOH. Hydrogen and lower alkyls of less than five carbons are particularly suitable. Thiophenes are particularly preferred with poly(3,4-ethylenedioxythiophene) being most preferred.

In one embodiment the conductive polymer layer is applied with a carrier liquid, such as in a slurry, wherein the conductive polymer and carrier liquid are applied to a surface by dipping or coating. The slurry comprises a solvent, preferably water and the conductive polymer is preferably poly(3,4-ethylenedioxythiophene). The carrier liquid is preferably a polar solvent, such as water, alcohol or acetonitrile or a mixture of water with polar solvent, with water being the most preferred solvent. The carrier liquid is in sufficient ratio to achieve a viscosity suitable for achieving an adequate coating with additional solvent being undesirable as the solvent is typically removed after application.

Conductive polymers, especially thiophenes, have a counter ion associated therewith. Counterions with low mobility are particularly preferred since they are less susceptible to migration, especially, under humid conditions. For this reason polymeric counterions have proven to be most effective. A particularly suitable counterion, particularly for polythiophene is polystyrene sulfonic acid (PSSA) since it has limited mobility and PSSA is now recognized as a preferred counterion.

Monoamines include any compounds containing only one amine functionality with a formula of $R^1NH_2$, $R^1R^2NH$, or $R^1R^2R^3N$ wherein $R^1$, $R^2$, $R^3$ independently may be alkyl, aromatic moieties containing other functional groups such as hydroxy, thiol, sulfide epoxy, ether, carbonyl, ester, acetal, amide, imide, nitrate, phosphonate, phosphate, hydrocarbyls or carboxylic with the proviso that none of $R^1$, $R^2$ or $R^3$ are an amine, a phosphonium, a sulfonium or any strong acid groups such as certain kinds of sulfuric, sulfonic, nitric, or halides, that has a pKa below 0.25 in water. More preferably, $R^1$, $R^2$, $R^3$ independently may be alkyl, aromatic moieties containing other functional groups such as hydroxy, thiol, sulfide epoxy, ether, carbonyl, ester, acetal, amide, imide, nitrate, phosphonate, phosphate or hydrocarbyls. Example of monoamines include: ammonia (ammonium hydroxide), ethylamine, diethylamine, triethylamine, propylamine, dipropylamine, tripropylamine, isopropylamine, diisopropylamine, butylamine, tripropylamine, dibutylamine, tributylamine, isobutylamine, diisobutylamine, triisobutylamine, methylethylamine, pentylamine, hexylamine, octylamine, decylamine, allylamine, ethanolamine, diethanolamine, triethanolamine, methylethanolamine, butylethanolamine, cyclohexylethanolamine, cyclohexyldiethanolamine, N-ethylethanolamine, N-propylethanol amine, tris(hydroxymethyl)aminomethane, 3-amino-1-propanol, amino-2-propanol, diisoprpanolamine, triisopropanolamine, 5-amino-1-pentanol, 6-amino-1-hexanol, pyridine and derivatives, aniline and derivatives, methyl-aniline, nitroaniline, 1-naphthylamine, 2-naphthylamine and glucosamine. The pKa of the monoamine in water is preferably 30 or above. It is most preferred that the monoamines contain at least one hydroxy functional groups and preferably no more than five hydroxyl functional groups.

Due to the non-crosslinking nature of these monoamine-weak acid combinations, they do not cause an increase in viscosity or agglomeration of the conductive polymer dispersion or solution. Since the monoamine-weak acid combinations contain only weak ionic bonds, the capacitors thus made demonstrate excellent leakage performance under high humidity conditions even without a water washing step. They are also less corrosive on metals, such as aluminum, than coverage enhancing agents that contain strong ionic bonds. Weak acids are defined herein as inorganic or organic acids with dissociation constant (pKa) of at least 0.25 to no more than 10 measured as a monomer in water. The preferred pKa range of the weak acid is 1-7 and the most preferred range is 2-6. It may contain one, two, three or even more acid functionalities. The weak acid may contain other functionalities such as hydroxy, thiol, epoxy, with the proviso that the weak acid does not contain an amine. Carbonic acid, boric acid, phosphoric acid, phosphonic acids, carboxylic acids such as acetic acid, acrylic acid, benzoic acid, malonic acid, maleic acid, succinic acid, glutaric acid, adipic acid, sebacic acid, phenol, benzoic acid, phthalic acid, 2,2-bis(hydroxymethyl)propionic acid (dimethylolpropionic Acid, Bis-MPA), citric acid, trimesic acid, butanetetracarboxylic acid and polyacrylic acid particularly suitable for demonstration of the invention with carboxylic acid, phosphoric acid and phosphonic acids being most preferred. By avoiding harsh chemical/electrochemical reactions on the dielectric, the inventive method demonstrates some unique advantages such as superior high voltage performance, reduced DC leakage and improved long term stability. Strong acids with pKa lower than 0.25, such as sulfuric acid, sulfonic acid, nitric acid, hydroiodic acid, hydrochloric, hydrobromic, etc. are not appropriate for demonstration of the invention due to poor performance, particularly in high humidity conditions.

The anode is a conductor preferably selected from a metal or a conductive metal oxide. More preferably the anode comprises a mixture, alloy or conductive oxide of a valve metal preferably selected from Al, W, Ta, Nb, Ti, Zr and Hf. Most preferably the anode comprises at least one material selected from the group consisting of Al, Ta, Nb and NbO. An anode consisting essentially of Ta and Al is most preferred.

The dielectric is a non-conductive layer which is not particularly limited herein. The dielectric may be a metal oxide or a ceramic material. A particularly preferred dielectric is the oxide of a metal anode due to the simplicity of formation and ease of use. The dielectric is preferably formed by dipping the anode into an anodizing solution with electrochemical conversion. Alternatively, a dielectric precursor can be applied by spraying or printing followed by sintering to form the layer. When the dielectric is an oxide of the anode material dipping is a preferred method whereas when the dielectric is a different material, such as a ceramic, a spraying or coating technique is preferred.

The anode lead wire is chosen to have low resistivity and to be compatible with the anode material. The anode lead wire may be the same material as the anode material or a conductive oxide thereof. Particularly preferred anode lead wires include Ta, Nb and NbO. The shape of the anode lead wire is not particularly limiting. Preferred shapes include round, oval, rectangular and combinations thereof. The shape of the anode lead wire is preferably chosen for optimum electrical properties.

The construction and manufacture of solid electrolyte capacitors is well documented. In the construction of a solid electrolytic capacitor a valve metal preferably serves as the anode. The anode body can be either a porous pellet, formed by pressing and sintering a high purity powder, or a foil which is etched to provide an increased anode surface area. An oxide of the valve metal is electrolytically formed to cover up to all of the surfaces of the anode and to serve as the dielectric of the capacitor. The solid cathode electrolyte is typically chosen from a very limited class of materials, to include manganese dioxide or electrically conductive organic materials including intrinsically conductive polymers, such as polyaniline, polypyrol, polythiophene and their derivatives. The solid cathode electrolyte is applied so that it covers all dielectric surfaces and is in direct intimate contact with the dielectric. In addition to the solid electrolyte, the cathodic layer of a solid electrolyte capacitor typically consists of several layers which are external to the anode body. In the case of surface mount constructions these layers typically include: a carbon layer; a cathode conductive layer which may be a layer containing a highly conductive metal, typically silver, bound in a polymer or resin matrix; and a conductive adhesive layer such as silver filled adhesive. The layers including the solid cathode electrolyte, conductive adhesive and layers there between are referred to collectively herein as the cathode which typically includes multiple interlayers designed to allow adhesion on one face to the dielectric and on the other face to the cathode lead. A highly conductive metal lead frame is often used as a cathode lead for negative termination. The various layers connect the solid electrolyte to the outside circuit and also serve to protect the dielectric from thermo-mechanical damage that may occur during subsequent processing, board mounting, or customer use.

The monoamine-weak acid combination is preferably applied with a carrier liquid such as in a solution or dispersion. It may also include other additives to increase the solubility of the amine-acid combination in solution. Preferred solvents are water or other polar solvents such as alcohols. Mixtures of water and polar solvents are also appropriate.

The ratio of monoamine and weak acid can vary. It is preferred that the monoamine and weak acid ratios be adjusted so the pH of the monoamine-weak acid combination is between pH 1.5-10, more preferably pH 2-7.

The concentration of the monoamine-weak acid in the solution or dispersion is not limited but it is preferred to be at least 0.001 molar to achieve the benefit of coverage enhancement.

Ammonium salts are widely used in traditional aluminum electrolytic capacitors as a solute in liquid electrolyte. For edge and corner coverage improvement of solid capacitors, a preferred way is to apply a coating of monoamine-weak acid combination, preferably in a carrier solution, prior to or in between, conductive polymeric coatings. It is hypothesized that the hydrophilic and ionic interaction between the monoamine-weak acid and the conductive polymer particles slows down the retreating of the polymer dispersion frontier from the edges and corners during the polymer drying step. Another preferred method is to use the monoamine-weak acid as an additive in the conductive polymer dispersion.

After the final conductive polymer coating is applied the coated element may be subjected to further processing steps such as solvent treatment, or humidity treatment as described in U.S. Publ. Pat. Appl. No. 2014/0340819, before or after carbon and silver coating. Preferred solvents for solvent treatment are water or other polar solvents such as methanol, ethanol, propanol, butanol, ethylene glycol, propylene glycol, glycerol, ethylene carbonate, propylene carbonate, acetonitrile, dimethylsulfonixide, dimethylformaide, dimethoacetamide, N-methylpyrrolidone, ethers, tetrahydrofuran, caprolatone, butyrolactone, etc. More preferred are mixture of water and the abovementioned polar solvents.

A few monoamine compounds such as ammonium sulfate, trimethyloctadecylammonium bromide, ammonia, L-cysteine, L-methionine, and dimethyldioctadecylammonium bromide are shown as comparative examples, and they all fail to improve corner and edge coverage adequately and are considered inferior to the inventive crosslinkers. These monoamine compounds are all used together with strong acids such as sulfuric acid or p-toluenesulfonic acid or contain anions of these strong acids and therefore have a pKa much lower than 0.25.

While described and illustrated as a conductive cathode layer on a solid cathode electrolytic capacitor the conductive coating can be applied on any surface wherein conductive properties are desired. The conductive coating is particularly suitable for use in instances where a conductive coating is required which can withstand humid conditions.

Preparation of PEDOT-PSSA and Conductive Polymer Dispersion A&B

A 4 L plastic jar, provided with a cooling jacket, was initially charged with 125 g of PSSA, 2531 g of DI water, 28.5 g of 1% iron(III) sulphate, and 21.5 g of sodium peroxodisulphate. The contents were mixed using a rotor-stator mixing system with perforated stator screen with a round hole size diameter of 1.6 mm. Subsequently, 11.25 g of 3,4-ethylenedioxythiophene (PEDOT) was added dropwise. The reaction mixture was sheared continuously with a shear speed of 8000 RPM with the rotor-stator mixing system for an additional 23 hours. The dispersion was treated with cationic and anionic exchange resin and filtered to get PEDOT-PSSA base slurry.

Conductive Polymer Dispersion A

To 120 g of the PEDOT-PSSA conductive polymer was added 4.8 g of DMSO, 6 g of water, 0.48 g of 3-glycidoxypropyltrimethoxysilane and 1.44 g of epoxy compound as described in U.S. Publ. Pat. Appl. No. 2015/0029642, followed by mixing in a cylinder container on a roller overnight.

Conductive Polymer Dispersion B

To 120 g of the PEDOT-PSSA conductive polymer was added 4.8 g of DMSO, 6 g of water, 0.48 g of 3-glycidoxypropyltrimethoxysilane and 1.44 g of linear hyperbranched binder as described in U.S. Publ. Pat. Appl. No. 2014/0160632, followed by mixing in a cylinder container on a roller overnight.

Conductive Polymer Dispersion C

To 120 g of the PEDOT-PSSA conductive polymer was added 4.8 g of DMSO, 6 g of water, 1.44 g of epoxy compound as described in U.S. Publ. Pat. Appl. No. 2015/0029642 and 0.12 g of Dynol®604, followed by mixing in a cylinder container on a roller overnight.

Conductive Polymer Dispersion D

To 60 g of Conductive Polymer Dispersion C was added 6 g of monoamine-weak acid combination Solution 4 (see below), followed by mixing in a cylinder container on a roller overnight.

Preparation of Amine-Acid Coverage Enhancing Agent Solutions

Solution 1

To 26.51 g of ammonium hydroxide solution in water (10%) were added 88.9 g of DI water and 4.549 g of acetic acid. The pH of the solution was 9.67.

Solution 2

To 4.814 g of Tris(hydroxymethyl)aminomethane (THMAM) were added 112.8 g of DI water and 2.386 g of acetic acid. The pH of the solution was 6.21.

Solution 3

To 2.697 g of Tris(hydroxymethyl)aminomethane (THMAM) were added 112.8 g of DI water and 4.503 g of sebacic acid. The pH of the solution was 5.52.

Solution 4

To 4.346 g of Triethanolamine (TEA) were added 112.8 g of DI water and 2.854 g of phosphoric acid. The pH of the solution was 3.

Solution 5

To 2.634 g of Tris(hydroxymethyl)aminomethane (THMAM) were added 112.8 g of DI water and 4.566 g of citric acid. The pH of the solution was 3.47.

Solution 6

To 3.785 g of Triethanolamine (TEA) were added 92 g of DI water and 4.215 g of phthalic acid. The pH of the solution was 3.92.

Solution 7

To 2.394 g of Triethanolamine (TEA) were added 92 g of DI water and 3.246 g of sebacic acid. The pH of the solution was 5.76.

Solution 8

To 3.517 g of Triethanolamine (TEA) were added 92 g of DI water and 4.583 g of p-toluene sulfonic acid. The pH of the solution was 2.42.

Solution 9

To 2.001 g of Ethylenediamine (EDA) were added 94 g of DI water and 3.999 g of acetic acid.

Solution 10

To 2.281 g of Ethylenediamine (EDA) were added 92 g of DI water and 3.719 g of p-toluene sulfonic acid.

Comparative Example 1

Figure 4:
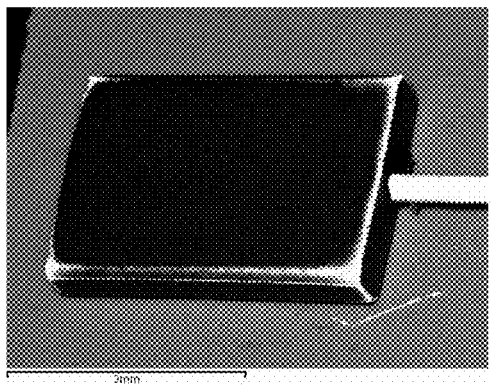
FIG. 4 illustrates the polymer coverage of a comparative example.

A series of tantalum anodes (68 microfarads, 16V) were prepared. The tantalum was anodized to form a dielectric on the tantalum anode. The anodized anode thus formed was dipped into a solution of iron (III) toluenesulfonate oxidant for 1 minute and sequentially dipped into ethyldioxythiophene monomer for 1 minute. The anodes were washed to remove excess monomer and by-products of the reactions after the completion of 60 minutes polymerization, which formed a thin layer of conductive polymer (PEDOT) on the dielectric of the anodized anodes. This process was repeated until a sufficient thickness was achieved. Conductive Polymer Dispersion A was applied to form an external polymer layer. After drying, another conductive polymer layer was applied and this was repeated 5 times, followed by sequential coating of a graphite layer and a silver layer to produce a solid electrolytic capacitor. Parts were assembled, packaged and surface mounted. ESR was measured before and after surface mount. The SEM coverage is shown in FIG. 4.

Inventive Example 1

Figure 5:
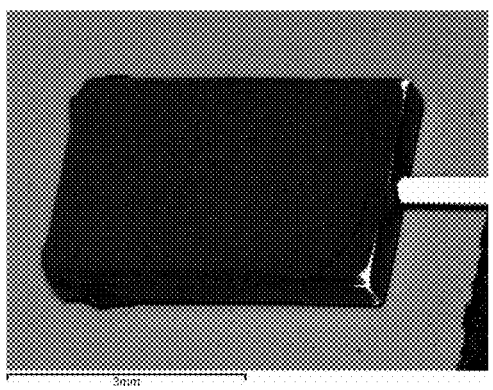
FIG. 5 illustrates the polymer coverage with an inventive example.

A series of tantalum anodes (68 microfarads, 16V) were prepared. The tantalum was anodized to form a dielectric on the tantalum anode. The anodized tantalum anode thus formed was dipped into a solution of iron (III) toluenesulfonate oxidant for 1 minute and sequentially dipped into ethyldioxythiophene monomer for 1 minute. The coated anodized tantalum anodes were washed to remove excess monomer and by-products of the reactions after the completion of 60 minutes polymerization, which formed a thin layer of conductive polymer (PEDOT) on the dielectric of the anodes. This process was repeated until a sufficient thickness was achieved. Conductive Polymer Dispersion A was applied to form an external polymer layer. After drying, alternating layers of monoamine-weak acid combination Solution 1 and Conductive Polymer Dispersion A were applied and repeated 5 times, followed by sequential coating of a graphite layer and a silver layer to produce a solid electrolytic capacitor. Parts were assembled, packaged and surface mounted. ESR was measured before and after surface mount. The SEM coverage is shown in FIG. 5.

Inventive Example 2

Figure 6:
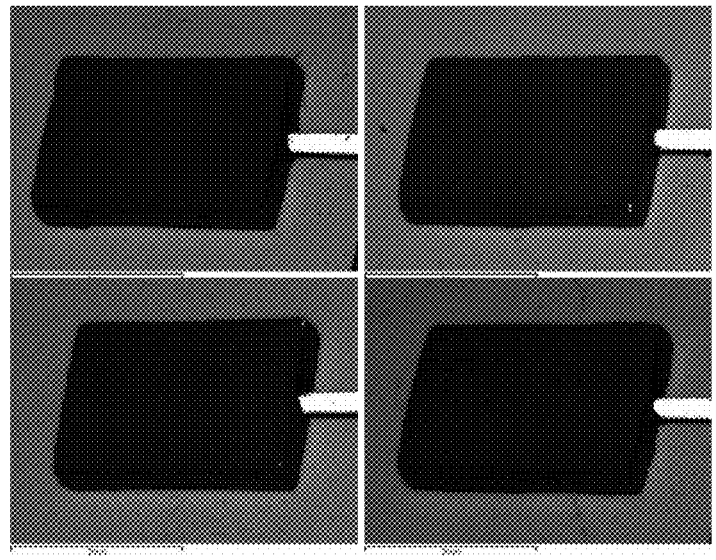
FIG. 6 illustrates the polymer coverage with an inventive example.

A series of tantalum anodes (68 microfarads, 16V) were prepared using the process in Inventive Example 1, except that the monoamine-weak acid solution used was Solution 2. The SEM coverage is shown in FIG. 6 (Top Left).

Inventive Example 3

A series of tantalum anodes (68 microfarads, 16V) were prepared using the process in Inventive Example 1, except that the monoamine-weak acid solution used was Solution 3. The SEM coverage is shown in FIG. 6 (Top Right).

Inventive Example 4

A series of tantalum anodes (68 microfarads, 16V) were prepared using the process in Inventive Example 1, except that the monoamine-weak acid solution used was Solution 4. The SEM coverage is shown in FIG. 6 (Bottom Left).

Inventive Example 5

A series of tantalum anodes (68 microfarads, 16V) were prepared using the process in Inventive Example 1, except that the monoamine-weak acid solution used was Solution 5. The SEM coverage is shown in FIG. 6 (Bottom Right).

As shown by Comparative Example 1 and Inventive Examples 1-5, represented in FIG. 4 vs. FIGS. 5 and 6, all of these monoamine-weak acid combinations showed edge and coverage enhancing properties even though monoamine cannot crosslink the conductive polymer dispersion. The pH of the monoamine-weak acid combinations used are all within the range of about 3 to about 9.7. The results of Comparative Example 1 and Inventive Examples 1-5 are tabulated in Table 1.

TABLE 1

|  | Corner and Edge Coverage |
| --- | --- |
| Inventive Example 1 | Top edges and top corners exposed |
| Inventive Example 2 | Complete |
| Inventive Example 3 | One corner exposed |
| Inventive Example 4 | One top corner barely visible |
| Inventive Example 5 | Complete |
| Comparative Example 1 | Top/side/bottom edges and all corners exposed |

Comparative Example 2

Figure 7:
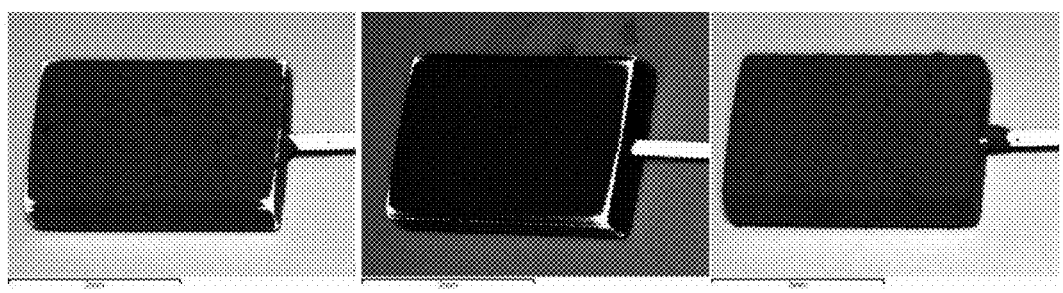
FIG. 7 illustrates the polymer coverage of Comparative Example 2, Comparative Example 4 and Inventive Example 6.

A series of tantalum anodes (33 microfarads, 25V) were prepared. The tantalum was anodized to form a dielectric on the tantalum anode. The anode thus formed was dipped into a solution of iron (III) toluenesulfonate oxidant for 1 minute and sequentially dipped into ethyldioxythiophene monomer for 1 minute. The anodes were washed to remove excess monomer and by-products of the reactions after the completion of 60 minutes of polymerization, thereby forming a thin layer of conductive polymer (PEDOT) on the dielectric of the anodes. This process was repeated until a sufficient thickness was achieved. Conductive Polymer Dispersion B was applied to form an external polymer layer. After drying, alternating layers of a monoamine-strong acid combination Solution 8 and Conductive Polymer Dispersion B were applied and repeated 6 times, followed by sequential coating of a graphite layer and a silver layer to produce a solid electrolytic capacitor. Parts were assembled, packaged and surface mounted. ESR was measured before and after surface mount. The SEM coverage is shown in FIG. 7 (Left).

Comparative Example 3

A series of tantalum anodes (33 microfarads, 25V) were prepared as described in Comparative Example 2, except for that the monoamine-strong acid combination solution was replaced by a commercially available decanediamine toluenesulfonate crosslinker solution, available as Clevios® K Primer. Visual inspection under optical microscope revealed that all corners and edges were completely covered.

Comparative Example 4

A series of tantalum anodes (33 microfarads, 25V) were prepared as described in comparative Example 2, except for that no crosslinker solution was used between external slurry layers. The SEM coverage is shown in FIG. 7 (Middle).

Inventive Example 6

A series of tantalum anodes (33 microfarads, 25V) were prepared. The tantalum was anodized to form a dielectric on the tantalum anode. The anode thus formed was dipped into a solution of iron (III) toluenesulfonate oxidant for 1 minute and sequentially dipped into ethyldioxythiophene monomer for 1 minute. The anodes were washed to remove excess monomer and by-products of the reactions after the completion of 60 minutes of polymerization, thereby forming a thin layer of conductive polymer (PEDOT) on the dielectric of the anodes. This process was repeated until a sufficient thickness was achieved. Conductive Polymer Dispersion B was applied to form an external polymer layer. After drying, alternating layers of monoamine-weak acid combination Solution 6 and Conductive Polymer Dispersion B were applied and repeated 6 times, followed by sequential coating of a graphite layer and a silver layer to produce a solid electrolytic capacitor. Parts were assembled, packaged and surface mounted. ESR was measured before and after surface mount. The SEM coverage is shown in FIG. 7 (Right).

Inventive Example 7

A series of tantalum anodes (33 microfarads, 25V) were prepared using the process in Inventive Example 6, except that the monoamine-weak acid combination Solution 7 is used. The SEM image of anodes after polymer dispersion coating was not taken but visual inspection under optical microscope revealed that all corners and edges were completely covered. The results of Comparative Examples 3 and 4 and Inventive Examples 6 and 7 are tabulated in Table 2.

TABLE 2

|  | Corner and Edge Coverage | % Anode above leakage limit |
| --- | --- | --- |
| Inventive Example 6 | Complete | 0 |
| Inventive Example 7 | Complete | 0 |
| Comparative Example 2 | Top/bottom edges and all corners exposed | 47.5% |
| Comparative Example 3 | Complete | 22.5% |
| Comparative Example 4 | Top/side/bottom edges and all corners exposed | Not tested |

Figure 8:
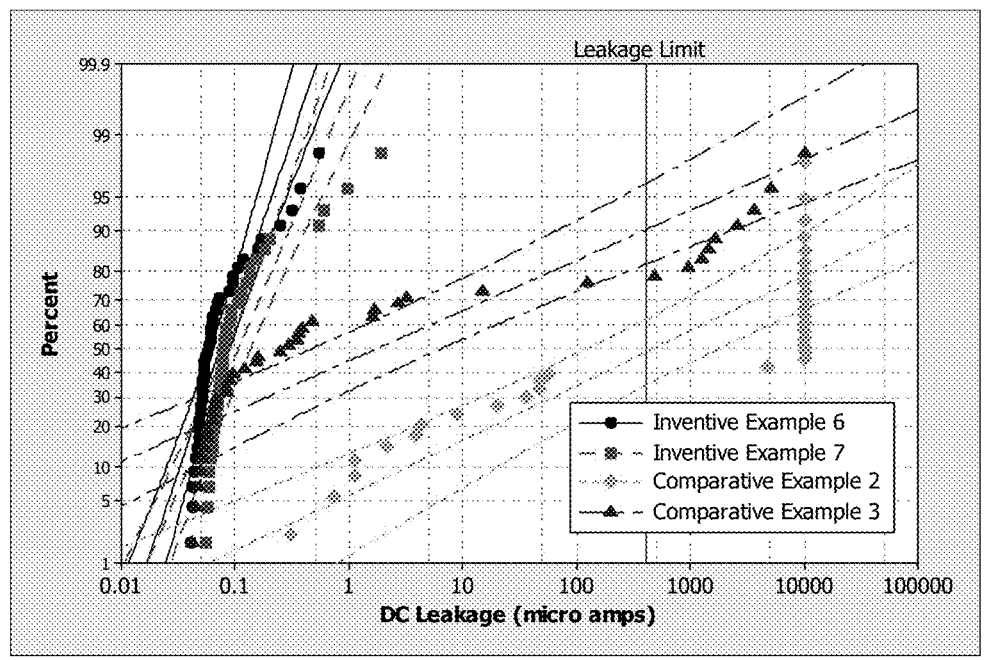
FIG. 8 illustrates the DC leakage of Inventive Examples 6 and 7 vs. Comparative Examples 2 and 3 after humidity treatment.

The capacitors prepared in the Inventive Examples 6 and 7 and Comparative Examples 2 and 3 were mounted onto a circuit board and placed in an environmental chamber set at 121° C. and 85% RH under 1.76 atm pressure for 21 hrs. The rated working voltage of 25V was applied to the capacitors. After the humidity treatment was complete, the capacitors were allowed to cool then they were retested. FIG. 8 graphically illustrates the DC leakage data after the humidity treatment. Comparative Example 2 used a monoamine-toluene sulfonic acid compound, which showed poor polymer coverage and a large number of electrical short failures after humidity treatment. Comparative Example 3 prepared with commercial diamine-toluene sulfonic acid compound available as Clevios® K Primer, demonstrated good coverage but performed very poorly in leakage testing after humidity treatment. The Inventive Examples 6 and 7 showed much lower DC leakage than Comparative Examples 2 and 3 even though the anode did not go through a water wash cycle to remove any ionic species after polymer layer was applied. Clearly, the current invention makes it possible to eliminate the water wash process without adversely affecting the performance.

Inventive Examples 6 and 7 when compared to Comparative Example 4 clearly illustrated the edge and coverage enhancing property of monoamine-weak acid compounds. When Inventive Example 6 is compared with Comparative Example 2 & 3, the result is very surprising. U.S. Pat. No. 8,882,856 suggests strong acid counter ions, such as toluene sulfonic acid, for diamine crosslinkers. However, in our result, toluene sulfonic acid is a very poor counter acid for the monoamine coverage enhancing agent, and the coverage is much worse than with the inventive monoamine-weak acid combination.

Comparative Example 5

Figure 9:
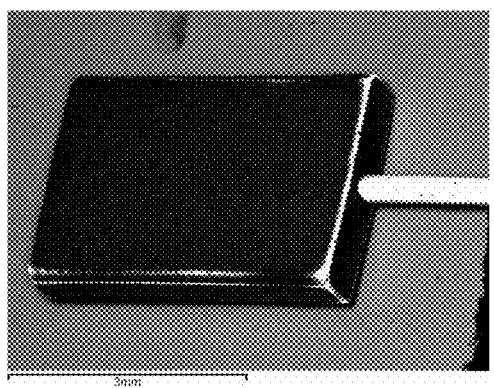
FIG. 9 illustrates the polymer coverage with a prior art nonionic primer.

A series of tantalum anodes (68 microfarads, 16V) were prepared using the process in Inventive Example 1, except that the monoamine-weak acid solution is replaced by 6% Glycerol solution in water. The SEM coverage is shown in FIG. 9.

Comparative Example 6

Figure 10:
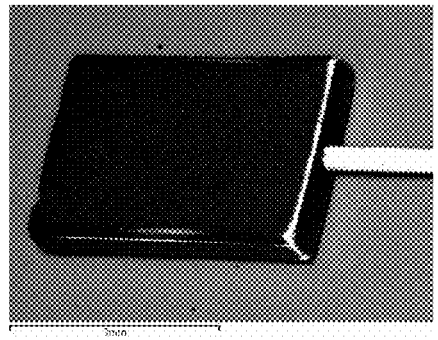
FIG. 10 illustrates the polymer coverage with a prior art primer solution.

A series of tantalum anodes (68 microfarads, 16V) were prepared using the process in Inventive Example 1, except that the monoamine-weak acid solution is replaced a mixture of 4.011% Glycerol and 1.989% acetic acid solution in water. The SEM coverage is shown in FIG. 10.

U.S. Pat. No. 8,771,381 teaches the use of nonionic polyols in between conductive polymer dispersion layers to improve polymer corner and edge coverage. Since some of the monoamine-weak acid compounds disclosed in this patent application contain hydroxyl groups, it is important to understand if the coverage enhancing effect is merely due to these hydroxyl groups. The result in Table 3 suggests that although glycerol improves the edge coverage slightly, it is not as effective as Inventive Example 1, which is one of the simplest monoamine-weak acid compounds. Having additional hydroxyl groups on the amine did improve the coverage even more, as shown by Inventive Example 2. Monoamines with hydroxyl groups are therefore more preferred.

TABLE 3

|  | Corner and Edge Coverage |
| --- | --- |
| Inventive Example 1 | Top edges and top corners exposed |
| Inventive Example 2 | Complete |
| Comparative Example 1 | Top/side/bottom edges and all corners exposed |
| Comparative Example 5 | Top/side/part of bottom edges and top corners exposed |
| Comparative Example 6 | Top/side/part of bottom edges and top corners exposed |

Comparative Example 7

In a 125 ml bottle were added 80 g of commercial conductive polymer dispersion, available as Clevios® KV2 from Heraeus, and 1.6 g of deionized water. The mixture was mixed by rolling on a roller at 60 rpm overnight. The viscosity was measured at 23° C. with a Brookfield RV Viscometer at 100 rpm using Spindle #3. The results are tabulated in Table 4.

Comparative Example 8

In a 125 ml bottle were added 80 g of commercial conductive polymer dispersion, available as Clevios® KV2 from Heraeus, and 1.6 g of Solution 9. The mixture was mixed by rolling on a roller at 60 rpm overnight. The viscosity was measured at 23° C. with a Brookfield RV Viscometer at 100 rpm using Spindle #3. The results are tabulated in Table 4.

Comparative Example 9

In a 125 ml bottle were added 80 g of commercial conductive polymer dispersion, available as Clevios® KV2 from Heraeus, and 1.6 g of Solution 10. The mixture was mixed by rolling on a roller at 60 rpm overnight. The viscosity was measured at 23° C. with a Brookfield RV Viscometer at 100 rpm using Spindle #3. The results are tabulated in Table 4.

Comparative Example 10

Figure 11:
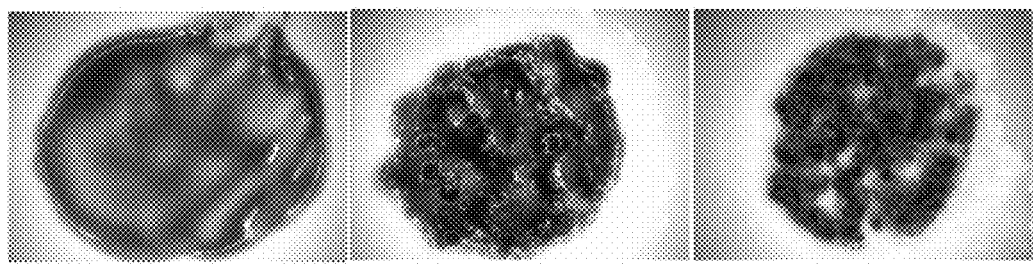
FIG. 11 illustrates optical images of Inventive Example 9 and Comparative Examples 10 and 11.

In a 125 ml bottle were added 80 g of commercial conductive polymer dispersion, available as Clevios® KV2 from Heraeus, and 8 g of Solution 9. Agglomeration of the polymer dispersion occurred instantly. Optical image of the mixture on a glass slide is shown in FIG. 11 (Middle).

Comparative Example 11

In a 125 ml bottle were added 80 g of commercial conductive polymer dispersion, available as Clevios® KV2 from Heraeus, and 8 g of Solution 10. The mixture was mixed by rolling on a roller at 60 rpm overnight. Agglomeration of the polymer dispersion occurred instantly. Optical image of the mixture on a glass slide is shown in FIG. 11 (Right).

Inventive Example 8

In a 125 ml bottle were added 80 g of commercial conductive polymer dispersion, available as Clevios® KV2 from Heraeus, and 1.6 g of Solution 1. The mixture was mixed by rolling on a roller at 60 rpm overnight. The viscosity was measured at 23° C. with a Brookfield RV Viscometer at 100 rpm using Spindle #3. The results are tabulated in Table 4.

Inventive Example 9

In a 125 ml bottle were added 80 g of commercial conductive polymer dispersion, available as Clevios® KV2 from Heraeus, and 8 g of Solution 1. No agglomeration was observed. Optical image of the mixture on a glass slide is shown in FIG. 11 (Left).

Comparative Examples 8 and 9 both used diamine crosslinkers and both led to viscosity increase of conductive polymer dispersion, which is attributed to the crosslinking effect of the diamines. When the amount of the crosslinker increased even more, they caused severe agglomeration of the conductive polymer dispersion as shown by Comparative Examples 10 and 11. Inventive Examples 8 and 9 proved that the addition of monoamine-acid combination to conductive polymer dispersion did not cause any viscosity increase or agglomeration at all. This is clearly an advantage of the current invention over the prior arts involving polyvalent crosslinkers.

TABLE 4

| | Amine-Acid | Viscosity after mixing (cPs) |
|---|---|---|
| Inventive Example 8 | Monoamine-weak acid | 360 |
| Comparative Example 7 | DI water | 391 |
| Comparative Example 8 | Diamine-weak acid | 409 |
| Comparative Example 9 | Diamine-strong acid | 431 |

Inventive Example 10

A series of tantalum anodes (33 microfarads, 25V) were prepared using the process in Comparative Example 3, except that 0.2% of monoamine-weak acid compound from Solution 6 was added to Conductive Polymer Dispersion B before dipping process. The samples were observed after each application with the results tabulated in Table 5.

Comparative Example 12

Figure 12:
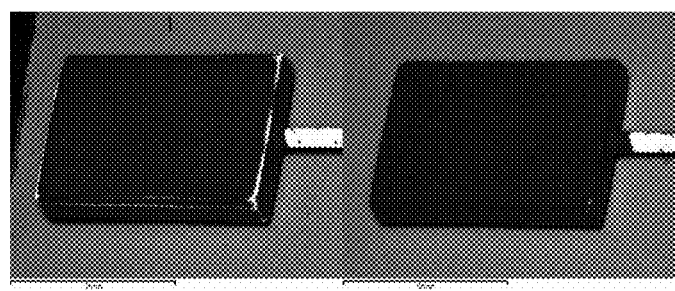
FIG. 12 illustrates the polymer coverage of Comparative Example 12 and Inventive Example 11.

A series of tantalum anodes (68 microfarads, 16V) were prepared using the process in Comparative 1, except that Conductive Polymer Dispersion A is replaced by Conductive Polymer Dispersion C. The SEM coverage is shown in FIG. 12 (Left).

Inventive Example 11

A series of tantalum anodes (68 microfarads, 16V) were prepared using the process in Comparative 1, except that Conductive Polymer Dispersion A is replaced by Conductive Polymer Dispersion D. The SEM coverage is shown in FIG. 12 (Right).

Because the monoamine-weak acid combinations do not crosslink the conductive polymer dispersion, they are not required to be applied separately from the conductive polymer layers as the diamine or polyamine crosslinkers in prior art. Inventive Example 10 & 11 demonstrated that the monoamine-weak acid combination can be used as an additive in the conductive polymer dispersion to improve the edge and corner coverage as demonstrated in Table 5 and FIG. 12.

TABLE 5

| # of Exposed Corners after Each Applied Polymer Layer | | | | |
|---|---|---|---|---|
| | 2nd layer | 3rd layer | 4th layer | 5th layer |
| Inventive Example 10 | 3 | 1 | 0 | 0 |
| Comparative Example 3 | 4 | 2 | 1 | 0 |

Comparative Example 13

Aluminum foil coupons with etched porous structure were anodically formed to 11 volts for a rated working voltage of 6.3 volts. They were immersed in a solution of ethylenedioxythiophene (EDT) in isopropanol. The isopropanol was evaporated at 40° C. for 2 minutes. The coupons were then dipped in an aqueous solution of ammonium persulfate (APS) with dispersed particles of sodium anthroquinone sulfonate (SAQS). EDT in contact with APS and SAQS was allowed to polymerize for 6 minutes. This chemical oxidative polymerization step was repeated multiple times to build the conductive polymer on the surface inside the pores. The anodes were dip-coated using Conductive Polymer Dispersion C to form the first layer of an external polymer. They were then immersed in a commercially available decanediamine toluenesulfonate crosslinker solution, Clevios® K Primer, and dried, followed by dip-coating of Conductive Polymer Dispersion C. The crosslinker solution and conductive polymer dispersion dipping were repeated one more time, followed by carbon and silver containing conductive coatings.

Inventive Example 12

Aluminum anodes were prepared with the same procedure as outlined in Comparative Example 13 except that the crosslinker solution was replaced by the monoamine-weak acid combination Solution 3.

Figure 13:
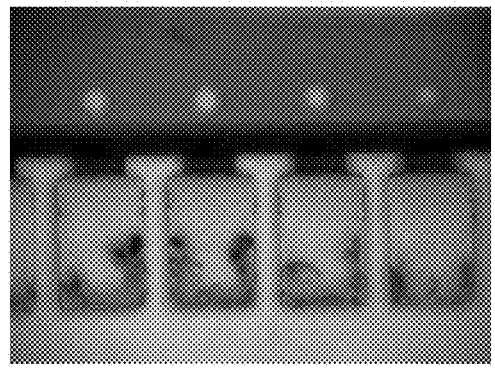
FIG. 13 illustrates corrosion with a prior art crosslinker solution.
Figure 14:
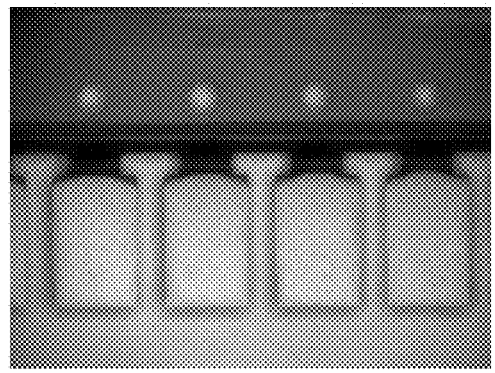
FIG. 14 illustrates no corrosion with an inventive coverage enhancing agent.

The anodes prepared in Comparative Example 13 and Inventive Example 12 were placed in an environmental chamber set at 121° C. and 85% RH under 1.76 atm pressure for 21 hours. After the humidity treatment, anodes prepared by the Inventive Example 12 showed no sign of corrosion as seen in FIG. 14 while anodes made by the Comparative Example 13 showed severe corrosion as seen in FIG. 13. None of these parts were water washed to remove any ionic species. This result clearly demonstrated the advantage of our invention over some of the prior arts that involve strong ionic species.

The invention has been described with reference to the preferred embodiments without limit thereto. One of skill in the art would realize additional embodiments and improvements which are not specifically set forth herein but which are within the scope of the invention as more specifically set forth in the claims appended hereto.

The invention claimed is:

1. A capacitor formed by a method comprising:
providing an anode;
forming a dielectric on said anode; and
forming a cathode layer over said dielectric by:
applying a monoamine;
applying a weak acid; and
applying a conductive polymer wherein said monoamine and said weak acid do not crosslink said conductive polymer.

2. A capacitor comprising:
an anode;
a dielectric at least partially encasing said anode; and
a cathode on said dielectric wherein said cathode comprises an intrinsically conducting polymer, a weak acid and a monoamine wherein said monoamine and said weak acid do not crosslink said conductive polymer.

3. The capacitor of claim 2 wherein said weak acid has a pKa of at least 0.25 to no more than 10 in water.

4. The capacitor of claim 2 wherein said weak acid has a pKa of at least 0.25 to no more than 10 in water measured as a monomer.

5. The capacitor of claim 3 wherein said weak acid has a pKa of at least 1 to no more than 7 in water.

6. The capacitor of claim 5 wherein said weak acid has a pKa of at least 2 to no more than 6 in water.

7. A capacitor comprising:
an anode;
a dielectric at least partially encasing said anode; and
a cathode on said dielectric wherein said cathode comprises an intrinsically conducting polymer, a weak acid and a monoamine wherein said weak acid is selected from the group consisting of carbonic acid, boric acid, phosphoric acid, phosphonic acids, carboxylic acids, acrylic acid, benzoic acid, malonic acid, maleic acid, succinic acid, glutaric acid, adipic acid, sebacic acid, phenol, benzoic acid, phthalic acid, 2,2-bis(hydroxymethyl)propionic acid, dimethylolpropionic acid, citric acid, trimesic acid, butanetetracarboxylic acid and polyacrylic acid and wherein said monoamine and said weak acid do not crosslink said conductive polymer.

8. The capacitor of claim 7 wherein said weak acid is selected from the group consisting of carboxylic acid, phosphoric acid, and phosphonic acids.

9. The capacitor of claim 2 wherein said monoamine comprises at least one hydroxyl group.

10. A capacitor comprising:
an anode;
a dielectric at least partially encasing said anode; and
a cathode on said dielectric wherein said cathode comprises an intrinsically conducting polymer, a weak acid and a monoamine wherein said monoamine has a pKa in water of at least 30 and wherein said monoamine and said weak acid do not crosslink said conductive polymer.

11. A capacitor comprising:
an anode;
a dielectric at least partially encasing said anode; and
a cathode on said dielectric wherein said cathode comprises an intrinsically conducting polymer, a weak acid and a monoamine wherein said monoamine is defined by a formula selected from the group consisting of: R1NH2, R1R2NH, and R1R2R3N wherein R1, R2, R3 independently are selected from alkyl, substituted alkyl, aromatic and substituted aromatic with the proviso that none of R1, R2 or R3 are an amine, a phosphonium, a sulfonium or any strong acid groups that has a pKa below 0.25 in water and wherein said monoamine and said weak acid do not crosslink said conductive polymer.

12. The capacitor of claim 11 wherein said $R^1$, $R^2$, $R^3$ are independently substituted with at least one group selected from the group consisting of hydroxy, thiol, sulfide, epoxy, phosphonate, phosphate and carboxylic.

13. The capacitor of claim 12 wherein said $R^1$, $R^2$, $R^3$ are independently substituted with at least one group selected from the group consisting of hydroxy, thiol, sulfide, epoxy, phosphonate and phosphate.

14. The capacitor of claim 12 wherein said monoamine comprises at least one hydroxy group.

15. The capacitor of claim 14 wherein said monoamine comprises no more than five hydroxyl groups.

16. The capacitor of claim 11 wherein said monoamine is selected from the group consisting of: ammonia, ethylamine, diethylamine, triethylamine, propylamine, dipropylamine, tripropylamine, isopropylamine, diisopropylamine, butylamine, tripropylamine, dibutylamine, tributylamine, isobutylamine, diisobutylamine, triisobutylamine, methylethylamine, pentylamine, hexylamine, octylamine, decylamine, allylamine, ethanolamine, diethanolamine, triethanolamine, methylethanolamine, butylethanolamine, cyclohexylethanolamine, cyclohexyldiethanolamine, N-ethylethanolamine, N-propylethanol amine, tris(hydroxymethyl)aminomethane, 3-amino-1-propanol, amino-2-propanol, diisoprpanolamine, triisopropanolamine, 5-amino-1-pentanol, 6-amino-1-hexanol, pyridine, aniline, methyl-aniline, nitro-aniline, 1-naphthylamine, 2-naphthylamine, and glucosamine.

17. The capacitor of claim 2 wherein said anode is a valve metal or a conductive oxide of said valve metal.

18. The capacitor of claim 17 wherein said valve metal is selected from the group consisting of Al, W, Ta, Nb, Ti, Zr and Hf.

19. The capacitor of claim 18 wherein said anode is selected from the group consisting of Al, Ta, Nb and NbO.

20. The capacitor of claim 2 wherein said dielectric is an oxide of said anode.

21. The capacitor of claim 2 wherein said conductive polymer is selected from the group consisting of polypyrrole, polyaniline and polythiophene.

22. The capacitor of claim 2 wherein said cathode further comprises an organic compound containing at least two epoxy functional groups.

23. The capacitor of claim 21 wherein said conductive polymer is poly(3,4-ethylenedioxythiophene).

24. A composition for the formation of a conductive coating comprising an intrinsically conducting polymer, a weak acid and a monoamine and wherein said monoamine and said weak acid do not crosslink said conductive polymer.

25. The composition for the formation of a conductive coating of claim 24 wherein said conductive polymer is selected from the group consisting of polypyrrole, polyaniline and polythiophene.

26. The composition for the formation of a conductive coating of claim 24 wherein said conductive polymer is poly(3,4-ethylenedioxythiophene).

27. The composition for the formation of a conductive coating of claim 24 wherein said weak acid has a pKa of at least 0.25 to no more than 10 in water.

28. The composition for the formation of a conductive coating of claim 24 wherein said weak acid has a pKa of at least 0.25 to no more than 10 in water as the monomer.

29. The composition for the formation of a conductive coating of claim 28 wherein said weak acid has a pKa of at least 1 to no more than 7 in water.

30. The composition for the formation of a conductive coating of claim 29 wherein said weak acid has a pKa of at least 2 to no more than 6 in water.

31. A composition for the formation of a conductive coating comprising an intrinsically conducting polymer, a weak acid and a monoamine wherein said weak acid is selected from the group consisting of carbonic acid, boric acid, phosphoric acid, phosphonic acids, carboxylic acids, acrylic acid, benzoic acid, malonic acid, maleic acid, succinic acid, glutaric acid, adipic acid, sebacic acid, phenol, benzoic acid, phthalic acid, 2,2-bis(hydroxymethyl)propionic acid, dimethylolpropionic acid, citric acid, trimesic acid, butanetetracarboxylic acid and polyacrylic acid and wherein said monoamine and said weak acid do not crosslink said conductive polymer.

32. A composition for the formation of a conductive coating comprising an intrinsically conducting polymer, a weak acid and a monoamine wherein said weak acid is selected from the group consisting of carboxylic acid, phosphoric acid, and phosphonic acids and wherein said monoamine and said weak acid do not crosslink said conductive polymer.

33. The composition for the formation of a conductive coating of claim 24 wherein said monoamine comprises at least one hydroxyl group.

34. A composition for the formation of a conductive coating comprising an intrinsically conducting polymer, a weak acid and a monoamine wherein said monoamine has a pKa in water of at least 30 and wherein said monoamine and said weak acid do not crosslink said conductive polymer.

35. A composition for the formation of a conductive coating comprising an intrinsically conducting polymer, a weak acid and a monoamine wherein said monoamine is defined by a formula selected from the group consisting of: R1NH2, R1R2NH, and R1R2R3N wherein R1, R2, R3 independently are selected from alkyl, substituted alkyl, aromatic and substituted aromatic with the proviso that none of R1, R2 or R3 are an amine, a phosphonium, a sulfonium or any strong acid groups that has a pKa below 0.25 in water and wherein said monoamine and said weak acid do not crosslink said conductive polymer.

36. The composition for the formation of a conductive coating of claim 35 wherein said $R^1$, $R^2$, $R^3$ are independently substituted with at least one group selected from the group consisting of hydroxy, thiol, sulfide, epoxy, phosphonate, phosphate and carboxylic.

37. The composition for the formation of a conductive coating of claim 36 wherein said $R^1$, $R^2$, $R^3$ are independently substituted with at least one group selected from the group consisting of hydroxy, thiol, sulfide, epoxy, phosphonate and phosphate.

38. The composition for the formation of a conductive coating of claim 36 wherein said monoamine comprises at least one hydroxy group.

39. The composition for the formation of a conductive coating of claim 38 wherein said monoamine comprises no more than five hydroxyl groups.

40. A composition for the formation of a conductive coating comprising an intrinsically conducting polymer, a weak acid and a monoamine wherein said monoamine is selected from the group consisting of: ammonia, ethylamine, diethylamine, triethylamine, propylamine, dipropylamine, tripropylamine, isopropylamine, diisopropylamine, butylamine, tripropylamine, dibutylamine, tributylamine, isobutylamine, diisobutylamine, triisobutylamine, methylethylamine, pentylamine, hexylamine, octylamine, decylamine, allylamine, ethanolamine, diethanolamine, triethanolamine, methylethanolamine, butylethanolamine, cyclohexylethanolamine, cyclohexyldiethanolamine, N-ethylethanolamine, N-propylethanol amine, tris(hydroxymethyl)aminomethane, 3-amino-1-propanol, amino-2-propanol, diisoprpanolamine, triisopropanolamine, 5-amino-1-pentanol, 6-amino-1-hexanol, pyridine, aniline, methyl-aniline, nitro-aniline, 1-naphthylamine, 2-naphthylamine, and glucosamine and wherein said monoamine and said weak acid do not crosslink said conductive polymer.

41. The composition for the formation of a conductive coating of claim 24 further comprises an organic compound containing at least two epoxy functional groups.

* * * * *